(12) United States Patent
Lueh et al.

(10) Patent No.: US 7,350,200 B2
(45) Date of Patent: Mar. 25, 2008

(54) METHOD AND SYSTEM OF CONTROLLING DYNAMICALLY COMPILED NATIVE CODE SIZE

(75) Inventors: Guei-Yuan Lueh, San Jose, CA (US); Tatiana Shpeisman, Menlo Park, CA (US); Michal Cierniak, San Jose, CA (US); Cheng-Hsueh Andrew Hsieh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 701 days.

(21) Appl. No.: 09/821,640

(22) Filed: Mar. 29, 2001

(65) Prior Publication Data

US 2002/0144240 A1 Oct. 3, 2002

(51) Int. Cl.
*G06F 9/45* (2006.01)
(52) U.S. Cl. .................. 717/148; 717/140; 717/145; 717/151
(58) Field of Classification Search ......... 717/158.145, 717/128.153, 136.127, 140, 145, 148–151; 707/206; 711/153, 170, 173
See application file for complete search history.

(56) References Cited

U.S. PATENT DOCUMENTS

| | | | |
|---|---|---|---|
| 5,845,298 A * | 12/1998 | O'Connor et al. .......... 707/206 |
| 6,070,173 A | 5/2000 | Huber et al. | |
| 6,093,216 A | 7/2000 | Adl-Tabatabai et al. | |
| 6,110,226 A | 8/2000 | Bothner | |
| 6,151,703 A * | 11/2000 | Crelier ..................... 717/136 |
| 6,158,048 A | 12/2000 | Lueh et al. | |
| 6,170,083 B1 * | 1/2001 | Adl-Tabatabai ............. 717/158 |
| 6,189,141 B1 * | 2/2001 | Benitez et al. ............. 717/153 |
| 6,249,912 B1 * | 6/2001 | Blandy ...................... 717/127 |
| 6,470,492 B2 * | 10/2002 | Bala et al. .................. 717/128 |
| 6,507,946 B2 * | 1/2003 | Alexander et al. .......... 717/145 |
| 6,671,707 B1 * | 12/2003 | Hudson et al. ............ 707/206 |
| 6,671,877 B1 * | 12/2003 | Ogasawara ................. 717/158 |
| 6,971,091 B1 * | 11/2005 | Arnold et al. .............. 717/145 |

OTHER PUBLICATIONS

Suganuma et al. Overview of the IBM Java Just-In-Time Compiler, Nov. 1, 2000, vol. 39, IBM Systems Journal.*
Adl-Tabatabai et al, Fast, Effective Code Generation in a Just-in-time Java Compiler, 1998, ACM.*
Stichnoth et al. Support for Garbage Collection at Every Instruction in a Java Compiler, 1999, ACM.*

(Continued)

*Primary Examiner*—Meng-Al T. An
*Assistant Examiner*—Insun Kang
(74) *Attorney, Agent, or Firm*—Blakely, Sokoloff, Taylor & Zafman LLP

(57) ABSTRACT

Space occupied by native code associated with a first method and stored within a native code space is reclaimed by determining whether the native code space exceeds a threshold in response to the invocation of a second method. Once the determination is made, byte code is compiled into native code associated with the second method and the native code associated with the first method may be reclaimed. In one embodiment, this reclamation occurs in response to a determination that the threshold has been exceeded and that the first method is inactive. In another embodiment, reclamation occurs in response to a determination that the threshold has been exceeded and that the first method is cold.

23 Claims, 8 Drawing Sheets

OTHER PUBLICATIONS

Sun, The Java HotSpot Performance Engine Architecture, Apr. 1999.*

Meloan, The Java HotSpot Performance Engine:An I-Depth Look, Jun. 1999, Sun Microsystems.*

Michal Cierniak, Guei-Yuan Lueh, James M. Stichnoth, "Practicing JUDO: Java Under Dynamic Optimizations", PLDI 2000, pp. 13-26, Vancoucer, British Columbia, Canada, Copyright 2000.

* cited by examiner

METHOD AND SYSTEM OF CONTROLLING DYNAMICALLY COMPILED NATIVE CODE SIZE

FIELD OF THE INVENTION

The field of the invention relates generally to computer software. More particularly, the field invention relates to optimization of dynamically compiled software. Still more particularly, the field of the invention relates to a method and system of controlling dynamically compiled native code size.

BACKGROUND OF THE INVENTION

In traditional computer programming systems, computer programs exist as platform-dependent, compiled object code within computer system memory or other computer storage media. Program code in such systems is typically evaluated based upon machine code execution time rather than source code compilation time because the translation or compilation of source code in these systems is static, (usually occurring only once prior to execution) rather than dynamic (occurring prior to each execution). Program code evaluation in such systems may also consider compiled code size either as an indicator of code efficiency and therefore speed or because of limited data processing system storage.

More recently, computer programming systems have begun to implement an interpreted language model in which each line of code is translated to machine executable or "native" code in succession during program execution. Interpreted languages include Basic, LISP, Smalltalk, and JAVA, developed by Sun Microsystems, Inc. Interpreted languages are often platform-independent and are therefore well-suited to distributed or communications network environments such as the Internet or World Wide Web (WWW) in which client or server data processing systems having various platforms may be in communication with one another. In such systems, an interpreter is often utilized locally on each system to receive and translate or interpret each line of platform-independent code to executable native code. Under the JAVA system, a JAVA program is created by first compiling code written in JAVA's well-defined source code format into compact, architecture-neutral object code known as JAVA bytecodes. Bytecodes are then executed at runtime by an interpreter known as a JAVA Virtual Machine (JVM) residing on a client or server computer. A JAVA "virtual" machine is not a physical hardware platform, but rather a low-level software emulator which reads and interprets individual bytecodes so that corresponding instructions may be executed by a native microprocessor. A JVM can be implemented on many different processor architectures and operating systems and JAVA bytecodes are consequently executable on numerous platforms.

The use of interpreted-language computer programming, while often yielding portable, platform-independent code, suffers from several drawbacks. Code interpreters such as the JAVA Virtual Machine (JVM) examine only one section of code or individual bytecode at a time rather than examining the program as a whole and do not retain any code translations following a code section's execution. Consequently, optimizations available with many traditional compilers cannot be implemented with interpreters such as the JVM and frequently-executed code must be re-interpreted each time it is received. Additionally, interpretation detracts from overall processor performance since interpreter execution occupies processor cycles that could otherwise be utilized to execute pre-compiled code. As a result, more recent interpreted-language programming systems have begun to use dynamic compilation such as the JAVA "Just-In-Time" (JIT) compiler in addition to or in place of interpretation to improve program efficiency.

A JAVA JIT compiler, typically integrated with a JVM, dynamically compiles JAVA bytecodes into native machine code during program execution. Compilation occurs "just-in-time" on a dynamic, method-by-method basis just prior to each program method's first invocation to generate native code which is retained until the program's execution terminates. As a result, subsequent method invocations may use previously-compiled code to execute more quickly than would be possible using a bytecode interpreter alone and by the end of program execution, the program image includes native code for each method invoked during program execution. While the use of dynamic compilation such as the JAVA JIT compiler has many obvious advantages, there are negative aspects of such implementations. If compiled native code is too large to fit into a data processing system's main memory there is additional overhead associated with using virtual memory, i.e. loading and storing native code and data to and from slower storage (usually disk memory). This overhead can in turn significantly increase the execution time of dynamically compiled programs and lessen gains otherwise achieved by dynamic compilation.

BRIEF DESCRIPTION OF THE DRAWINGS

The present invention is illustrated by way of example and not limitation in the figures of the accompanying drawings, in which:

FIG. 2a illustrates a conventional data processing system useable with the present invention;

FIG. 2b illustrates a high-level block diagram of the data processing system depicted in FIG. 2a;

DETAILED DESCRIPTION OF THE INVENTION

A method and system of controlling dynamically compiled native code size is disclosed. In the following detailed description, numerous specific details are set forth in order to provide a thorough understanding of the present invention. However, it will be apparent to one of ordinary skill in the art that these specific details need not be used to practice the present invention. In other circumstances, well-known structures, materials, circuits, processes and interfaces have not been shown or described in detail in order not to unnecessarily obscure the present invention.

Figure 1:
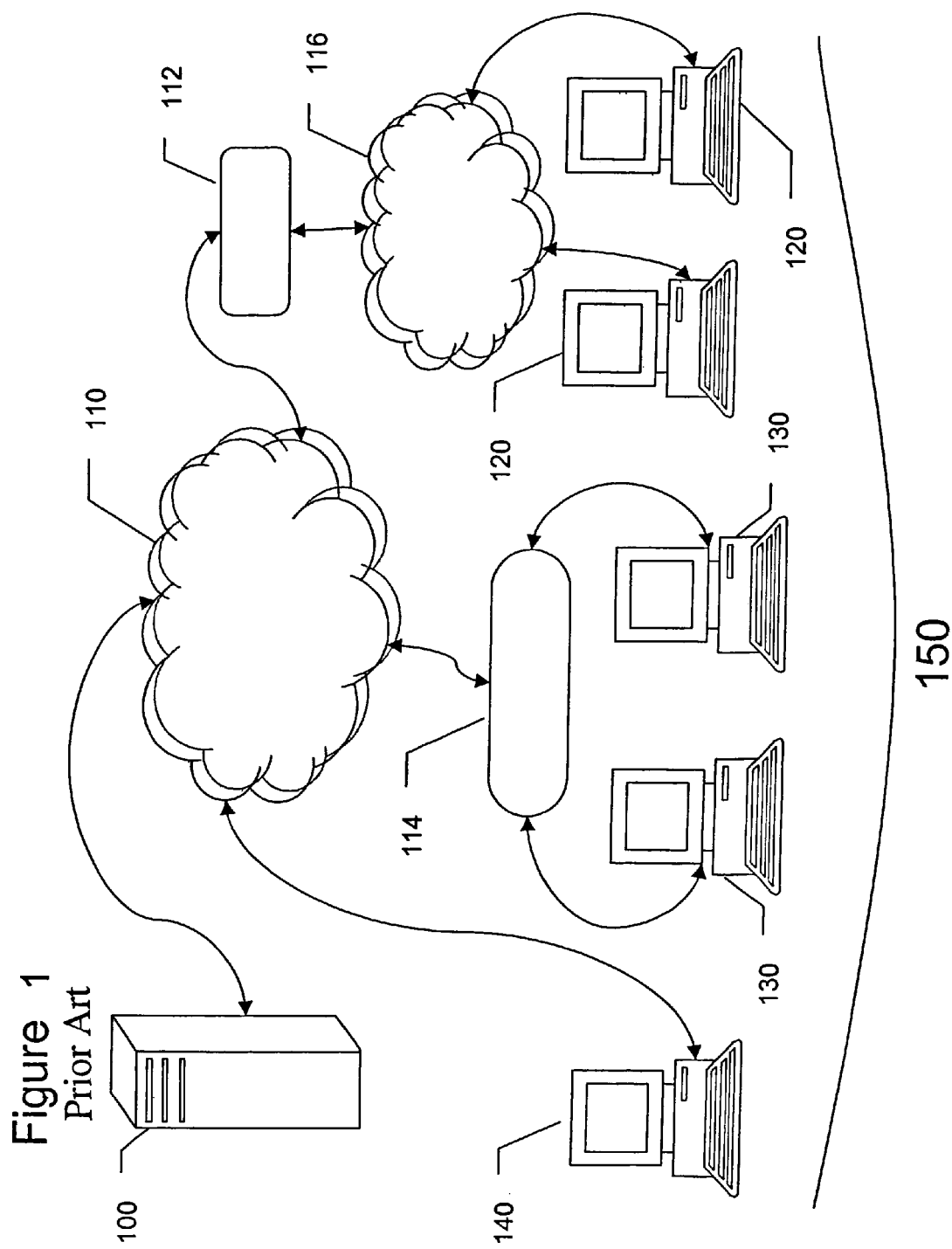
FIG. 1 illustrates a conventional communications network topology in which the present invention may be implemented.

Referring now to FIG. 1, a diagram illustrates various network topologies in which the present invention may be utilized. In conventional network architectures, a server computer system 100 is coupled to a network 110. Using conventional network protocols, server 100 may communicate through network 110 to client computer systems 150 connected through networks 110 and 116 in various ways. For example, client 140 is connected directly to network 110 via an adapter such as a network interface card, a CSU/DSU (channel service unit/data service unit), a modem, or any other well known network interface adapter and a network transmission line such as twisted pair copper wire, coaxial cable, optical fiber, or other transmission media. In an alternative topology, clients 130 may be connected through network 110 using a modem pool 114. A conventional modem pool 114 allows a plurality of client systems to connect over telephone lines with one or more modems in modem pool 114 for connection through network 110. In another alternative network topology, network 110 is connected to a gateway computer 112. Gateway computer 112 is used to route data to clients 120 through network 116. In this manner, clients 120, which may be coupled to network 116 by any of the various methods described above, can communicate with each other through network 116 or with server 100 through gateway 112 and network 110.

Networks 110 and 116 may each be organized as either a wide area network (WAN) covering a large geographic area or a geographically smaller local area network (LAN). Wide area networks may include conventional network backbones, long-haul telephone lines, Internet service providers, various levels of network routers, and other conventional means for routing data between computers. Each network 110 and 116 may be private, for use by members of a particular company or organization, in which case the network is described as an intranet, or public, as for example, a portion of the Internet. In one embodiment, communications network 116 is a wide area network including the Internet, or other proprietary networks such as America Online™, CompuServe™, Microsoft Network™, and Prodigy™ and communications network 110 is a broadband local area network. While physical transmission lines have been illustrated for clarity, in alternative embodiments of the present invention the use of wireless connections or wireless networks are also contemplated.

Using one of a variety of network connection means, server computer 100 can communicate with client computers 150 using conventional means. In a particular implementation of this network configuration, a server computer 100 may operate as an application server or a web server if the World-Wide Web (WWW) portion of the Internet is used for network 116. Using the HTTP protocol and the HTML or XML coding language across network 116, server 100 may communicate across the World-Wide Web with clients 150. In this configuration, clients 150 use a client application program known as a web browser such as the Netscape™ Navigator™ formerly published by Netscape Corporation of Mountain View, Calif., the Internet Explorer™ published by Microsoft Corporation of Redmond, Wash., the user interface of America Online™, or the web browser or HTML/XML translator of any other well-known supplier. Using such conventional browsers and the World-Wide Web, clients 150 may access image, sound, graphical, and textual data provided by server 100 and receive program code such as JAVA bytecodes, facilitating the execution of Web application software via a virtual machine implementation.

Figure 2:
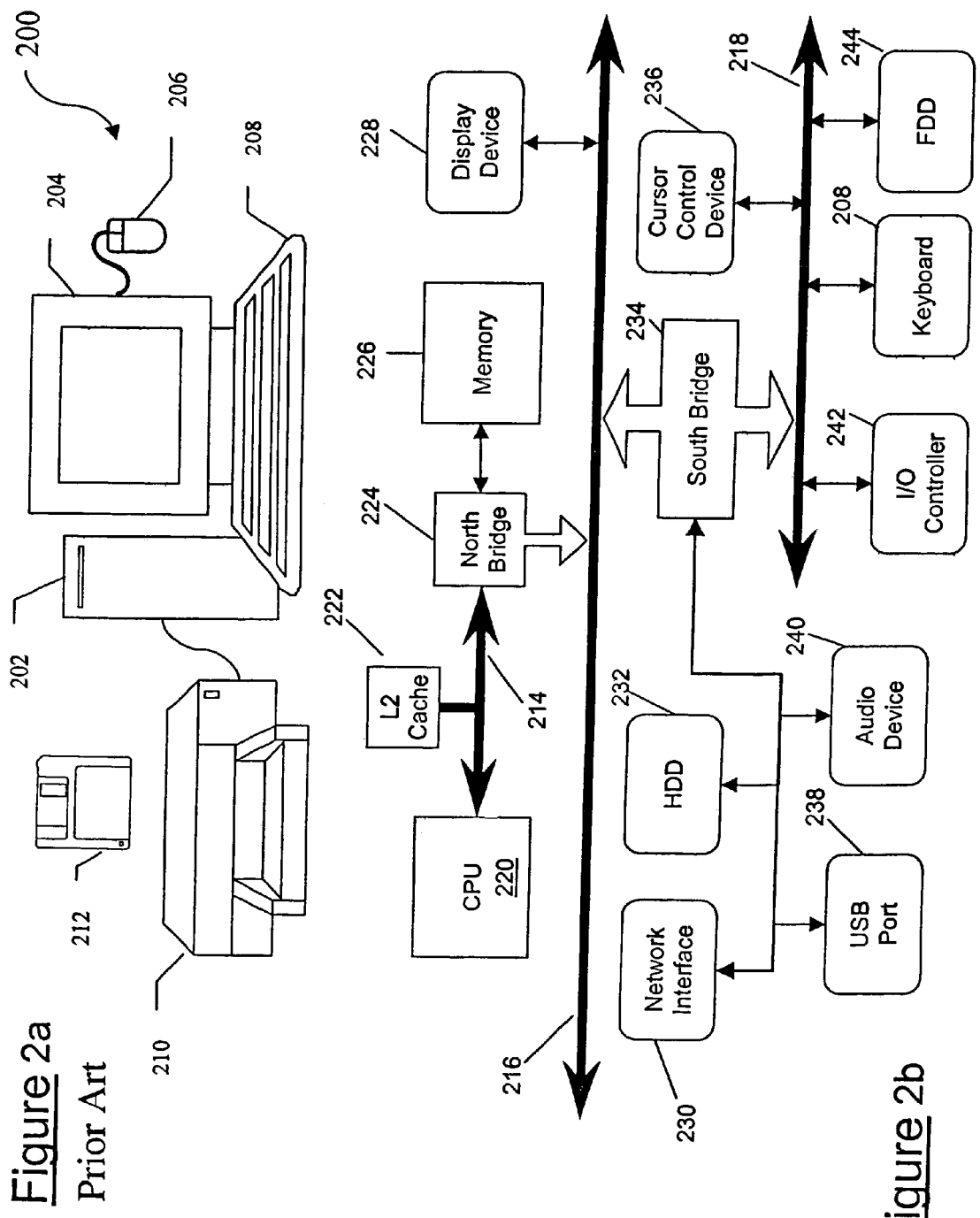

Referring now to FIG. 2a, a conventional computer system 200 such as an exemplary client 150 or server 100 computer system useable with the present invention is illustrated. Computer system 200 is comprised of a system unit 202, output devices such as display 204 and printer 210, and input devices such as keyboard 208, and mouse 206. Computer system 200 receives data for processing by the manipulation of input devices 208 and 206 or directly from fixed or removable media storage devices such as disk 212 and network interfaces (not shown). Computer system 200 then processes data and presents resulting output data via output devices such as display 204, printer 210, fixed or removable media storage devices like disk 212 or network interfaces.

Referring now to FIG. 2b, there is depicted a high-level block diagram of the components of a data processing system such as the computer system 200 illustrated by FIG. 2a. System unit 202 of computer system 200 may include a processing device such as central processing unit (CPU) or processor 220 connected to a level two (L2) cache 222 over a processor system bus (PSB) 214. Processor system bus 214 is in turn coupled to an expansion bus such as local bus 216 and a memory 226 via a north bridge circuit 224. Local bus 216 may include a peripheral component interconnect (PCI), Video Electronics Standards Association (VESA) bus or the like, tightly coupled to the processor 220 and the processor system bus 214 to permit high-speed access to select devices such as display device 228.

Memory 226 may include read-only (ROM) and/or random access (RAM) memory devices such as a synchronous dynamic random access memory (SDRAM) module capable of storing data as well as instructions to be executed by processor 220. Access to data and instructions stored within memory 226 is provided via a memory controller (not shown) within north bridge circuit 224. L2 cache 222 is similarly used, typically in a hierarchical manner, to store data and/or instructions for direct access by processor 220. Display device 228 may include a cathode ray tube (CRT) display such as display 204, liquid crystal display (LCD), or a similar device for displaying various kinds of data to a computer user, coupled to the system via a display adapter (not shown). For example, image, graphical, or textual information may be presented to the user on display device 228. System unit 202 of computer system 200 may also feature an expansion or "compatibility" bus 218 such as the Industry Standard Architecture (ISA) bus, and a south bridge circuit 234 coupling it to local bus 216 to facilitate the attachment of other, relatively slower devices to the system 200. South bridge circuit 234 may also include, as illustrated, a universal serial bus (USB) port 238 as well as other direct connections for devices such as a network interface card 230, a data storage device, such as a magnetic or optical disk drive 232, and an audio device 240 such as a speaker coupled to system 200 via a sound card or similar adapter.

Other devices not directly coupled to south bridge 234 may be connected to the system 200 via an expansion bus 218 as illustrated. A floppy disk drive (FDD) 244 providing additional data storage capacity on removable media storage devices such as disk 212, and input devices such as keyboard 208 and cursor control device 236 may each be coupled to expansion bus 218 in this manner to communicate data, instructions, and/or command selections to processor 220. Cursor control device 236 may comprise a conventional mouse such as mouse 206 of FIG. 2a, a trackball, or any other device capable of conveying desired cursor manipulation. Similarly, expansion bus 218 includes an input/output (I/O) controller having standard serial and parallel port functionality for connecting other I/O devices such as printer 210 to the system.

Alternatively, a data processing system may comprise a network computer or thin client device, such as the WebTV Networks™ Internet terminal or the Oracle™ NC. Similarly, a data processing system may also comprise a laptop or palm-top computing device, such as the Palm Pilot™ or a robust cellular telephone, where such devices are currently being used with Internet micro-browsers. Such a network computer or thin client device may not necessarily include all of the devices and features of the above-described exemplary computer system; however, the functionality of the present invention or a subset thereof may nevertheless be implemented with such devices.

The present invention may include software, information processing hardware, and various processing steps, which will be described below. The features and process operations of the present invention may be embodied in machine, data processing system, or computer-executable instructions embodied within readable media including read-only memory, random access memory, magnetic disk storage media such as disk 212 of FIG. 2a, optical storage media, flash memory devices, as well as electrical, optical, acoustical, or other forms of propagated signals (e.g. carrier waves, infrared signals, digital signals, etc.). The instructions can be used to cause a general purpose or special purpose processor such as processor 220, arranged in a uni-processor or multiprocessor configuration and programmed with the instructions, to perform the described methods of the present invention. Alternatively, the features or operations of the present invention may be performed by specific hardware components that contain hard-wired logic for performing the operations, or by any combination of programmed machine, data processing system, or computer components and custom hardware components.

Figure 3:
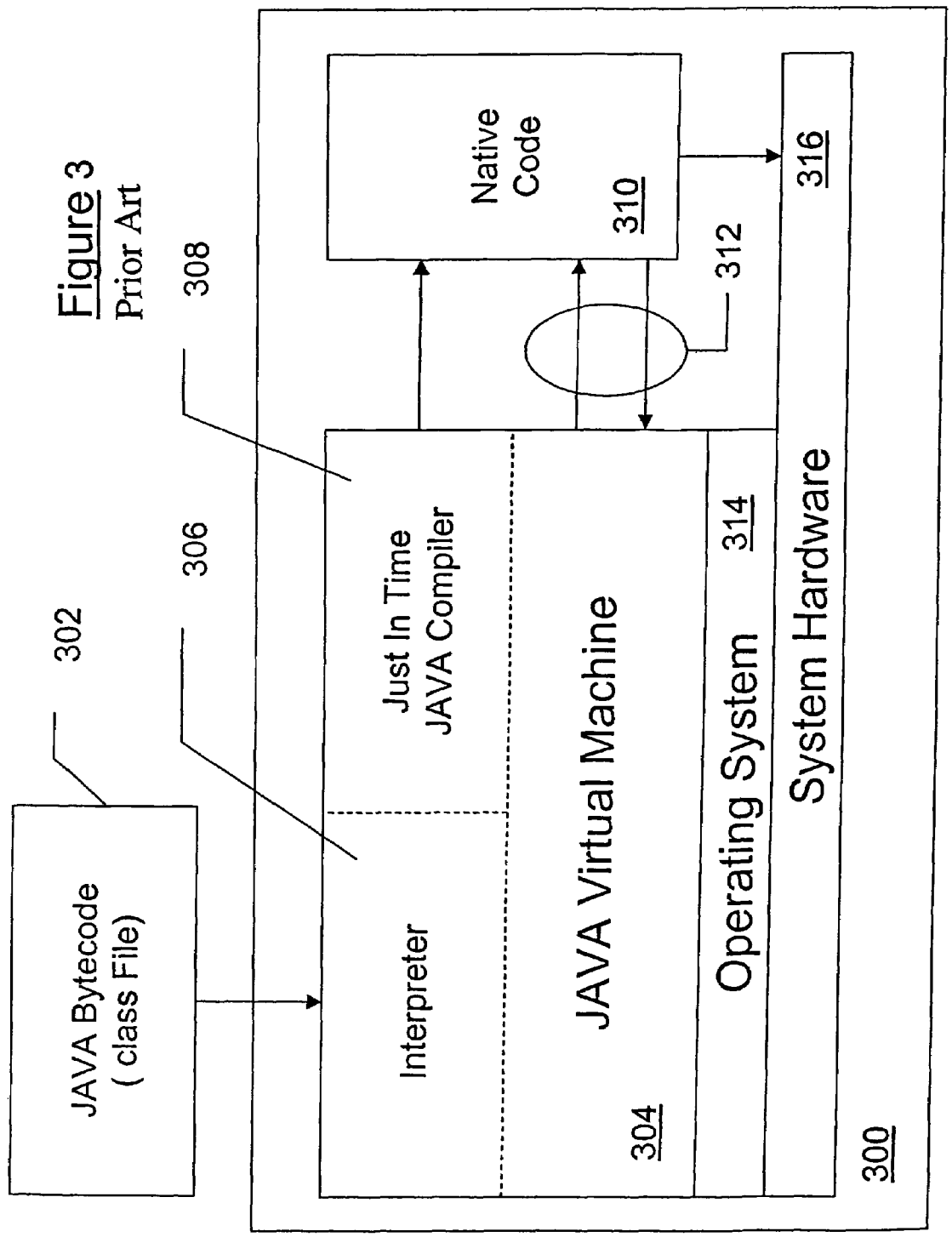
FIG. 3 illustrates an architectural system diagram depicting the operation of a JAVA virtual machine within a conventional data processing system.

Referring now to FIG. 3, an architectural system diagram depicting the operation of a JAVA virtual machine within a conventional data processing system such as computer system 200 of FIG. 2a is illustrated. A system 300 may include an operating system 314 allocating access to hardware 316 resources and may also include a JAVA Virtual Machine (JVM) implementation 304 capable of executing JAVA programs in bytecode 302 format as depicted in FIG. 3. The illustrated JAVA Virtual Machine 304, running on a client or server computer system 300, relies on services and hardware resources 316 such as registers, JAVA stacks, a heap, and a method area provided by underlying operating system 314 to execute JAVA programs. The JAVA Virtual Machine 304 may utilize a JAVA Interpreter 306 or a JAVA "Just-In-Time" (JIT) compiler 308 to generate executable native code 310 from a received JAVA bytecode class file 302.

In a networked environment, a user first accesses a server such as server 100 of FIG. 1 through a network such as network 110 and retrieves or downloads a desired JAVA class file 302 into a client computer system 300 such as one of clients 150 of FIG. 1. After the class file 302 has been downloaded, the JAVA Virtual Machine 304 verifies the class file to ensure that the program will not cause security violations or cause harm to computer system resources. After the JAVA program has been verified, a JAVA JIT compiler 308 may compile the JAVA class file 302 and generate executable native processor code 310. Then this dynamically compiled code 310 may be executed directly on computer hardware 316. In order to maintain the state of the JAVA Virtual Machine 304 and make system calls during the above-described process, native code 310 and JAVA Virtual Machine 304 communicate using various calls 312.

Figure 4:
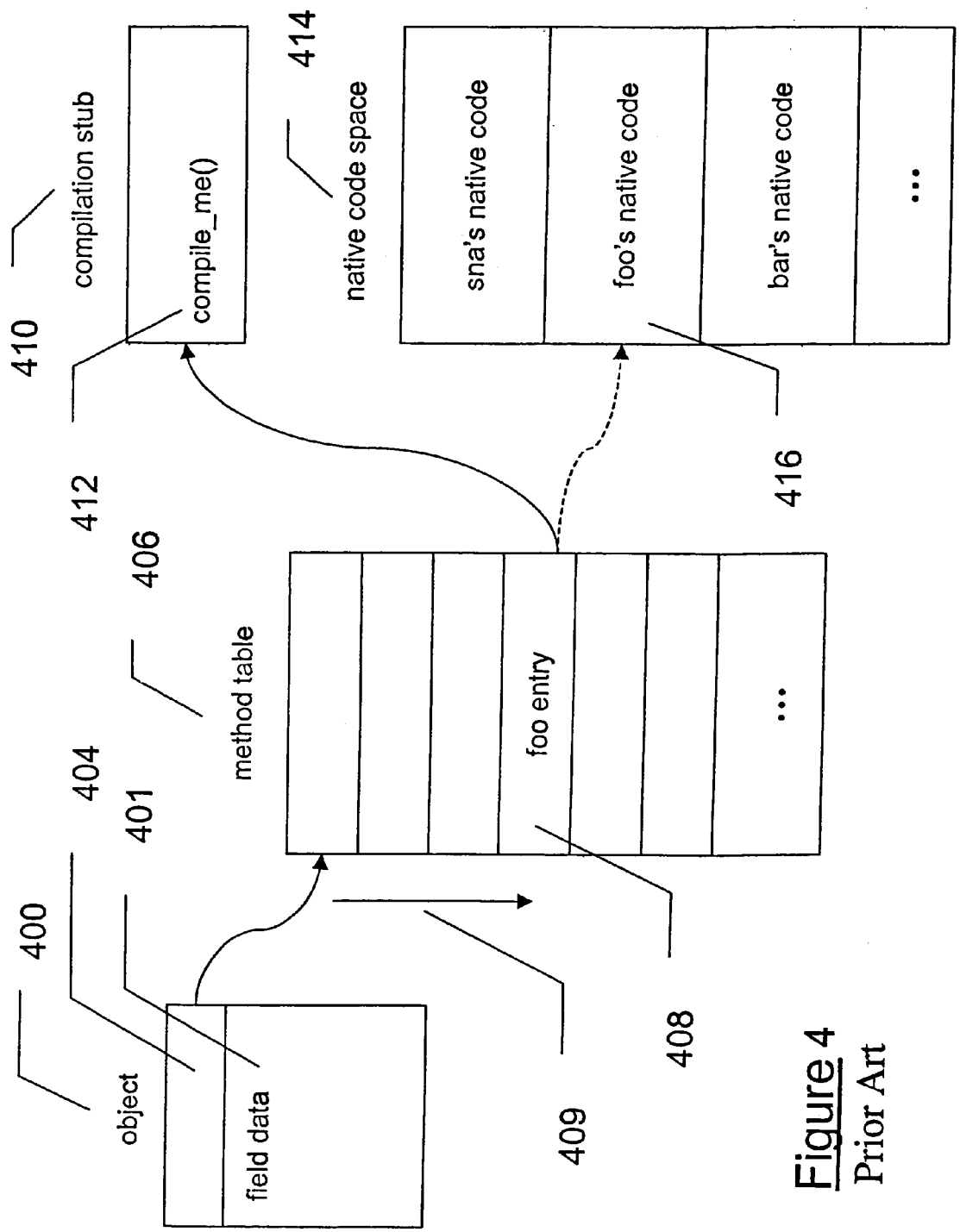
FIG. 4 illustrates a conventional JAVA object method invocation flow diagram.

Referring now to FIG. 4, a conventional JAVA object method invocation flow diagram is illustrated. Under the JAVA system, an object 400 contains data such as field 401 and belongs to a class which defines that particular kind of object's implementation. For each defined class, a method table 406 is created containing an entry for each method of the class and the first field 404 of each object of the class contains a reference to the class's method table 406. To invoke a method "foo", the method table pointer 404 and an offset 409 of the desired method's entry 408 within the method table are used to resolve the location of the desired method's code 416.

In a conventional JAVA system, each method table entry is initially set to reference a compilation stub 410 when the method table is created by JVM 304. When a method is invoked for the first time during a virtual machine instance, a compilation routine 412 within the stub 410 is executed which in turn invokes the JVM's dynamic compiler, JIT 308, to compile the invoked method's bytecodes into executable native code 416 stored within a native code space 414. The method table entry 408 corresponding to the invoked method is then updated to reference the compiled native code 416. By resolving this symbolic compilation stub 410 reference to a direct reference to executable native code 416 (indicated by the dashed arrow), dynamic, just-in-time compilation can provide faster method execution times for previously invoked methods and consequently faster overall program execution for many JAVA programs as compared to bytecode interpretation.

Figure 5:
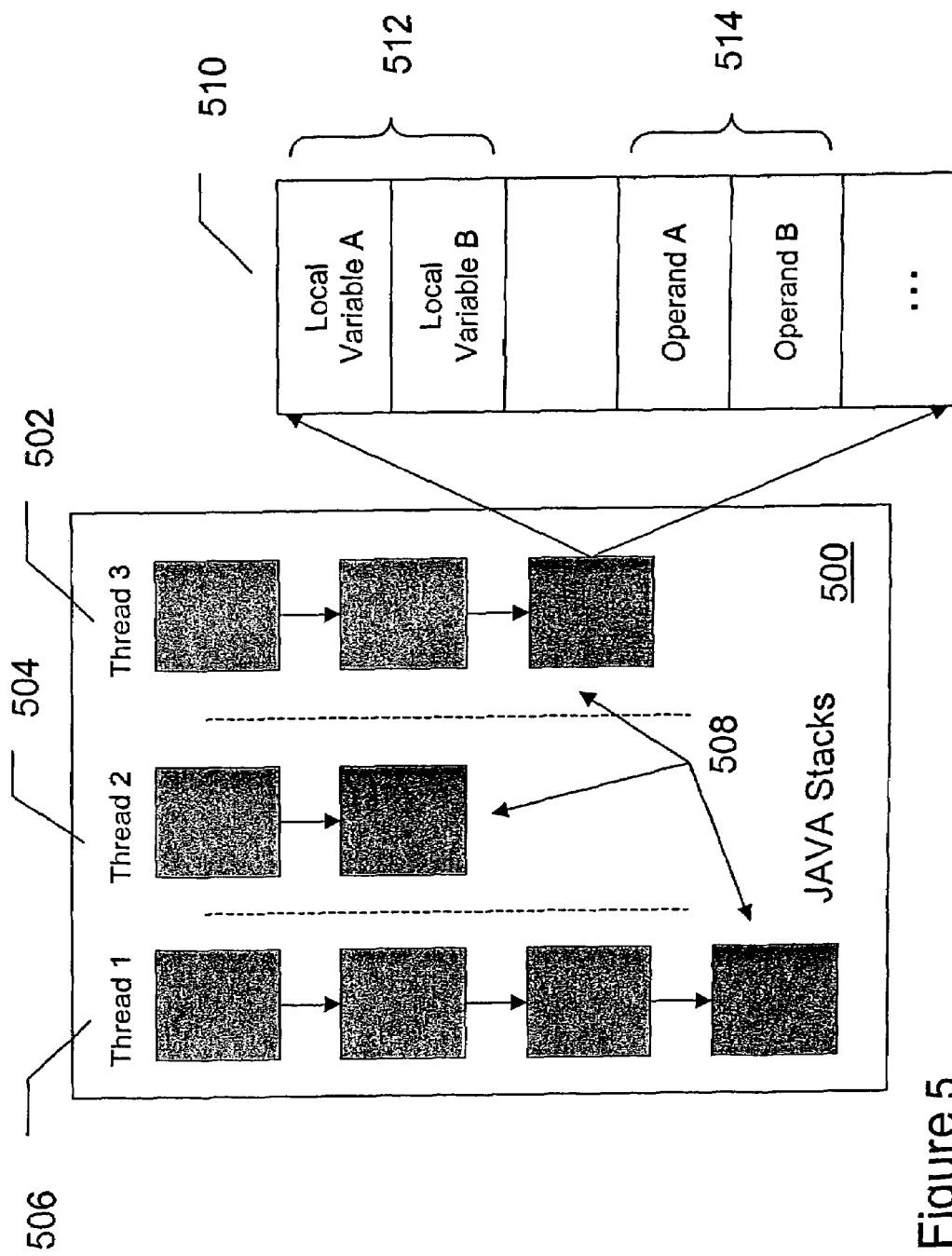
FIG. 5 illustrates a block diagram of a runtime environment data area of a conventional JAVA virtual machine.

Referring now to FIG. 5, a block diagram of a runtime environment data area 500 of a conventional JAVA virtual machine is illustrated. The JAVA system includes support for the simultaneous operation of multiple program contexts or "threads" and as each thread begins, a JAVA stack 502-506 is created and associated with it by the JAVA Virtual Machine. Each JAVA stack 502-506 is composed of one or more stack frames each containing the state of one JAVA method invocation. The state of a JAVA method invocation includes its local variables, the parameters with which it was invoked, its return value (if any), as well as intermediate calculations. FIG. 5 depicts a JVM runtime environment in which three threads are executing, each with its own associated JAVA stack 502-506. It will be appreciated that greater or fewer threads may exist in any given JVM implementation or instance. The method that is currently being executed by each thread is that thread's current method and the stack frame for the current method is the current frame 508. When a thread invokes a JAVA method, the virtual machine creates and pushes a new frame onto the thread's JAVA stack. This new frame then becomes the current frame 508. When a method completes, whether normally or abruptly, the JAVA virtual machine pops and discards the method's stack frame and the frame for the previous method becomes the current frame 508. As shown in the illustrated embodiment, a stack frame 510 may be used to store parameters and local variables 512, operands 514, intermediate computations, and other data such as data identifying the frame's associated method, the invoking method's frame, stack pointers, and program counters. The JAVA Virtual Machine has no registers to hold intermediate data values but rather uses the above-described stacks to store intermediate data values. This approach was taken by the designers of the JAVA system to keep the virtual machine's instruction set compact and to facilitate implementation on architectures with few or irregular general purpose registers.

Figure 6:
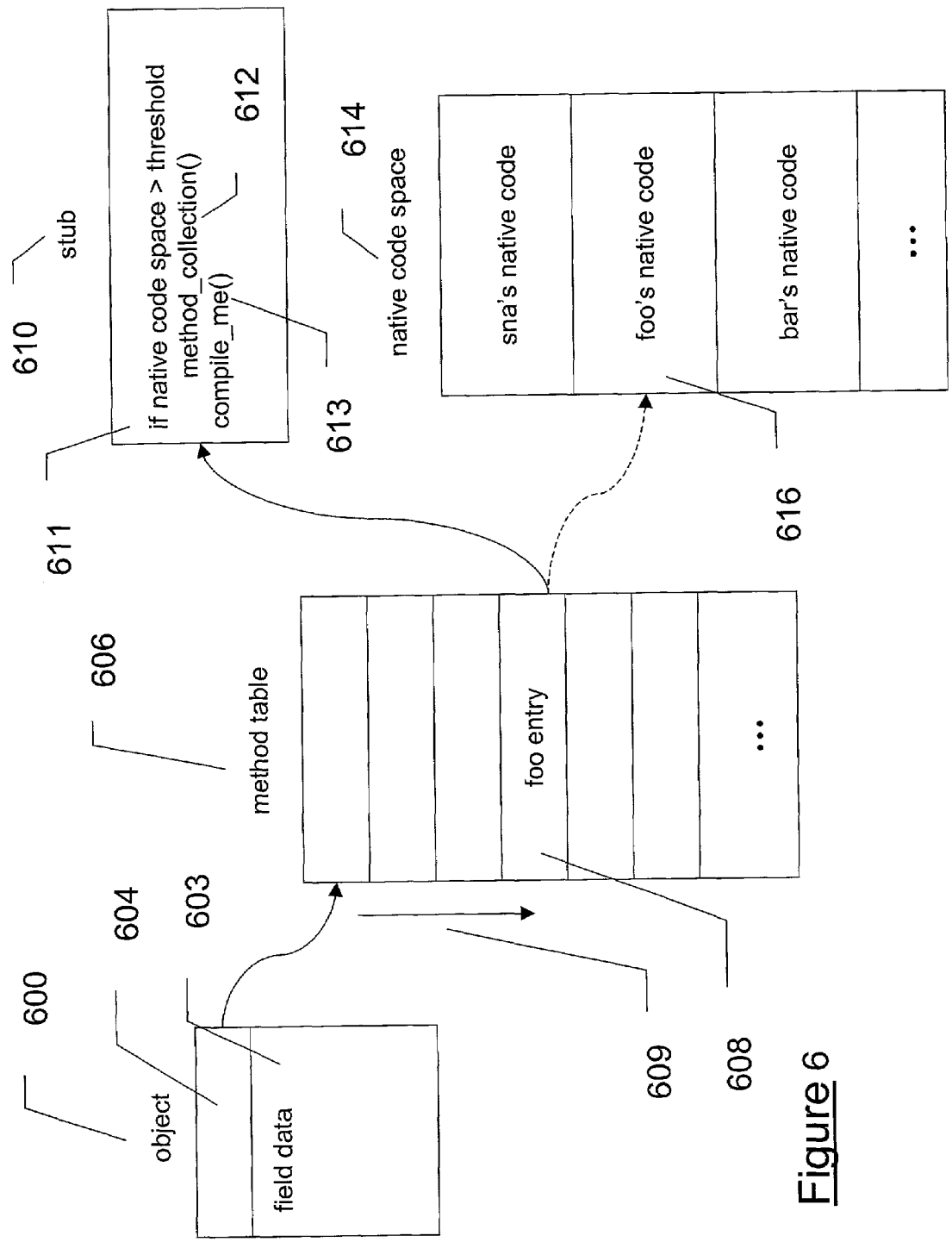
FIG. 6 illustrates a JAVA object method invocation flow diagram according to one embodiment of the present invention.

Referring now to FIG. 6, a JAVA object method invocation flow diagram according to one embodiment of the present invention is illustrated. As in the conventional method invocation flow diagram of FIG. 4, the illustrated invention embodiment includes an object 600 including one or more fields of data 603 as well as a reference or pointer 604 in a first object field to a method table 606. Method table 606 is constructed in the same manner as the method table 406 depicted in FIG. 4, containing an entry 608 for each method of the class located at an offset 609 within the table 606 facilitating the resolution of a location of a desired method's code 616. Similarly, prior to the first invocation of a method, the method's corresponding entry 608 in its class's method table 606 contains a symbolic reference to a stub 610 rather than direct reference to the method's executable native code 616.

However, the illustrated embodiment contains additional program code inserted into stub 610 including a threshold check 611 to determine whether the total amount of space occupied by compiled native program code (native code space 614) exceeds a defined threshold, and a code space collection routine 612 to reclaim code space occupied by the native code of selected methods. In the illustrated embodiment, when a method is invoked for the first time during a virtual machine instance, a threshold check 611 is first performed and a method_collection routine 612 is conditionally invoked if the predefined native code space size threshold has been exceeded. Once the native code of any previously-invoked methods has been reclaimed, their corresponding method table entries are updated to re-reference compilation stub 610 just as when the method table 606 was first created by the JVM so that later invocations of the reclaimed method or methods will invoke the JIT compiler to re-compile their associated bytecode. Following the threshold check and conditional native code reclamation, a compilation routine 613 is performed which in turn invokes JVM dynamic compilation of the presently-invoked method. The method table entry 608 corresponding to the currently-invoked method may then be updated as described with reference to FIG. 4 to reference. In this manner the native code of selected methods is reclaimed, thus reducing the overall amount of native code stored within memory and consequently improving cache or other memory performance and the efficiency with which retained native code is executed.

Figure 7:
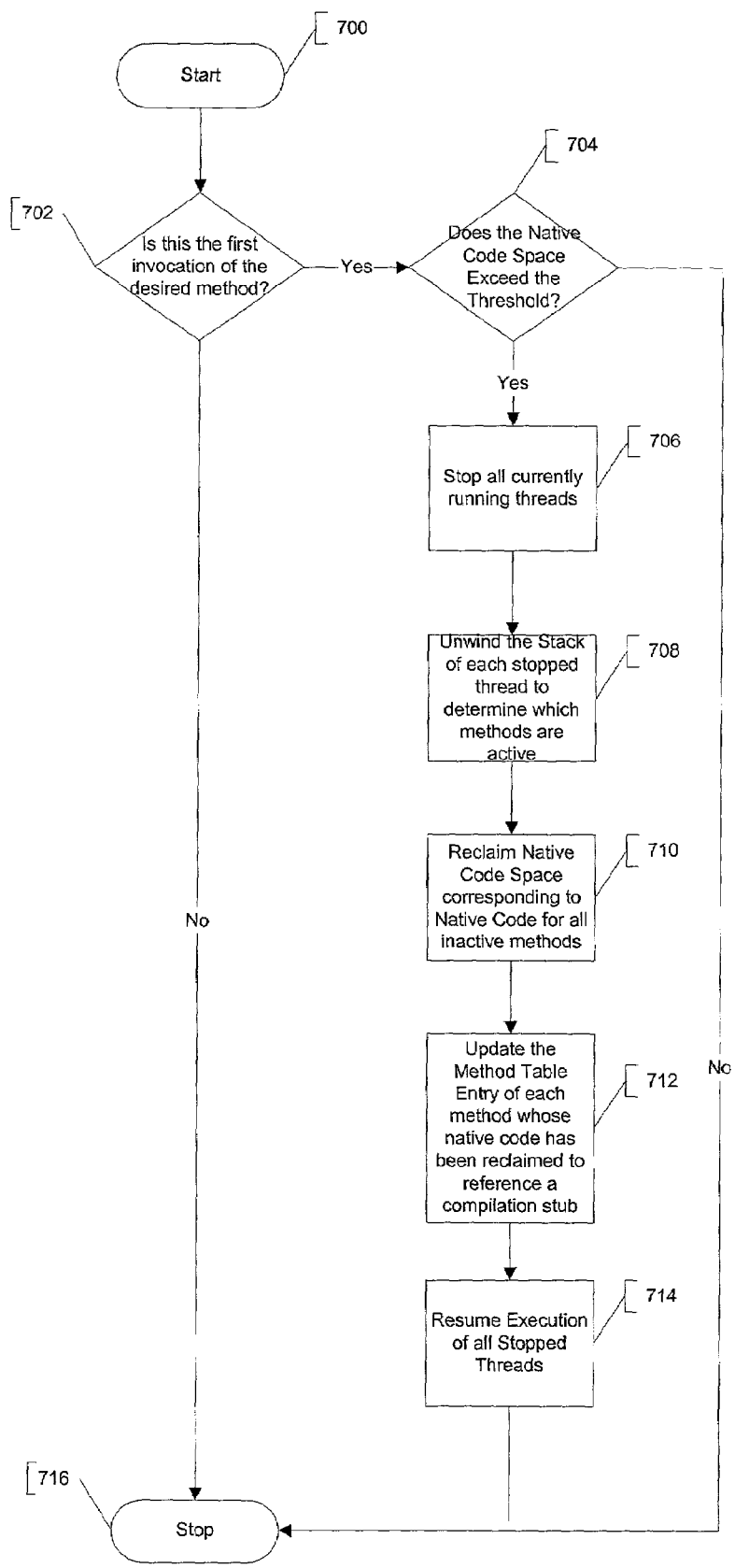
FIG. 7 illustrates a high-level logic flowchart of one embodiment of the method of the present invention.

Referring now to FIG. 7, a high-level logic flowchart of one embodiment of the method of the present invention is illustrated. FIG. 7 depicts a process by which code space occupied by the native code of selected methods is reclaimed beginning at block 700. Thereafter, a determination is made whether a desired method has been previously invoked (block 702) by resolving the method's corresponding method table entry reference and determining whether native code exists for the method in the native code space. It should be appreciated that a method which has had its native code reclaimed using the method of the present invention may appear as having not been previously invoked and consequently produce the same determination outcome. If native code does not exist in the native code space for either reason, the process advances to determine whether the native code space exceeds a predefined threshold (block 704), alternatively, the process terminates (block 716). Similarly, if the predefined native code size threshold has not been exceeded, the process terminates (block 716) and the desired method may be subsequently dynamically compiled using JAVA Just-In-Time compilation.

If the native code space size threshold is determined to be exceeded, a runtime helper routine, stop_all_threads( ), is invoked which stops and returns all JAVA threads that are currently running (block 706). Next, the stack of each stopped thread is unwound to determine which methods are currently active on each thread (block 708). In the illustrated embodiment, each method having a frame on a thread's JAVA stack is active on the thread as it is either currently executing or waiting for the completion of another method to resume execution. Once all active methods have been identified (block 708) the executable native code associated with each inactive method is then collected or reclaimed (block 710). Following this reclamation (block 710) the method table entries of each "reclaimed" method may then be updated to reference an appropriate stub (block 712) so that any re-invocation of a reclaimed method will cause the method's recompilation and that serious program execution errors which could result from the use of incorrect native code direct references may be avoided. Thereafter the execution of all previously stopped threads may be resumed (block 714) and the process may terminate (block 716).

Figure 8:
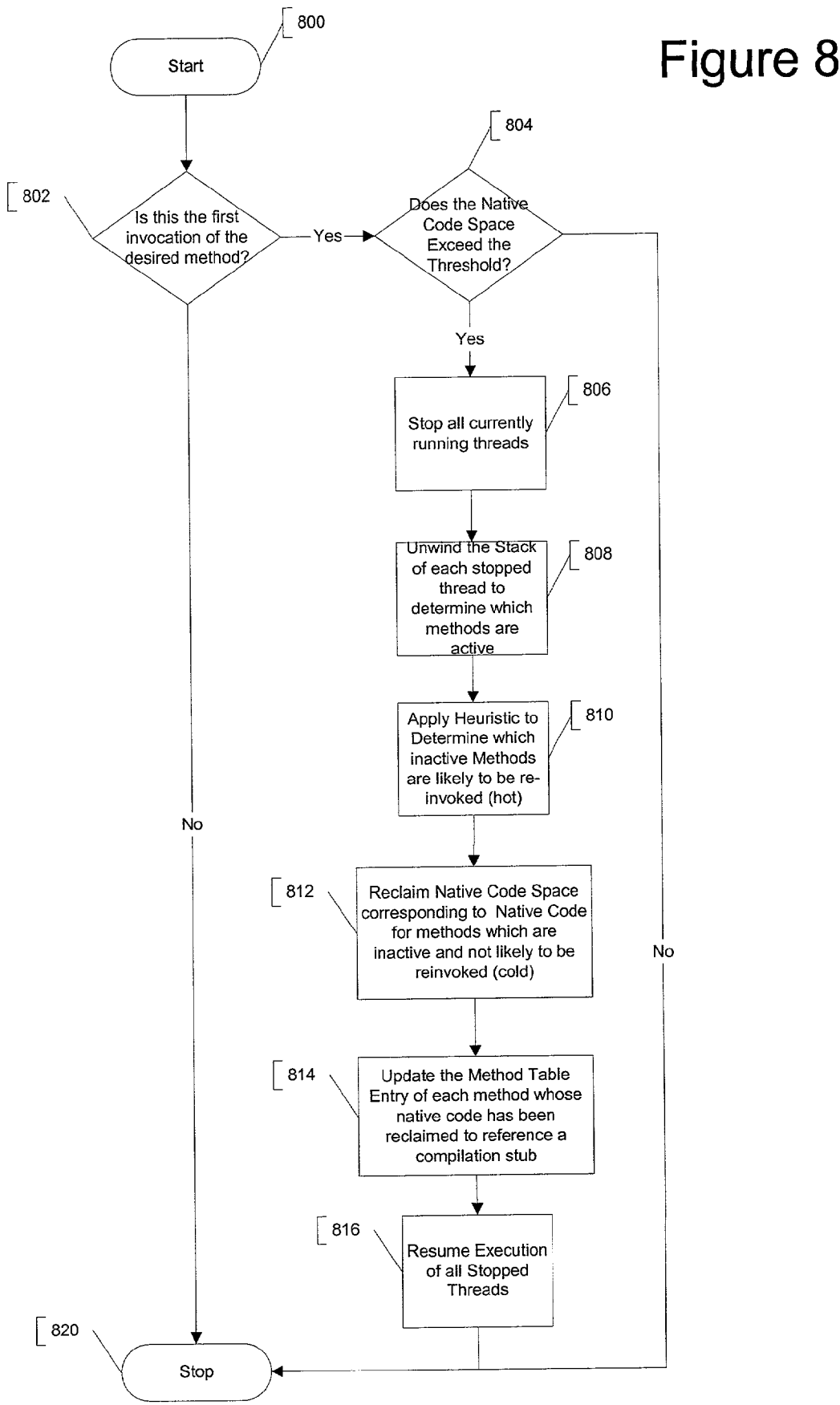
FIG. 8 illustrates a high-level logic flowchart of an alternative embodiment of the method of the present invention.

Referring now to FIG. 8, a high-level logic flowchart of an alternative embodiment of the method of the present invention is illustrated. The process by which code space occupied by the native code of selected methods is reclaimed depicted by FIG. 8 is identical to that illustrated by FIG. 7 up until the point after the stack for each stopped thread is unwound (block 808). Rather than relying solely on method activity versus inactivity to distinguish reclaimable from retainable native method code, the method embodiment illustrated by FIG. 8 applies one or more heuristics to determine which of the inactive methods are likely to be re-invoked during subsequent program execution (block 810). By reclaiming only those methods which are inactive and cold (i.e. unlikely, as defined by a particular heuristic, to be invoked subsequently during execution) (block 812) the depicted embodiment avoids overhead associated with recompiling methods and may therefore improve program performance. The illustrated process then proceeds to update method table entries (block 814) as necessary and resume all previously stopped threads (block 816) before termination (block 820) as described with respect to FIG. 7.

Various techniques involving temporal or spatial locality principles can be implemented to determine which methods are likely to be subsequently re-invoked (hot methods). For example, in one embodiment a reference count heuristic is implemented in which the JIT compiler creates a counter for each method and causes it to be incremented each time the method is invoked. Methods can then be sorted by their reference counts and a threshold, specifying a minimum number of invocations necessary for a method to be retained, may be defined and utilized. In another embodiment, a variation of the reference count heuristic is implemented in which the JIT created counters are periodically reset such that only those methods which are frequently executed within a recent period of time are considered "hot" and consequently more deserving of retention. In yet another embodiment, a "call chain" heuristic may be implemented in which methods that reside within the top frames of a stack are identified when the stack is unwound and annotated. The bytecodes of these methods are in turn scanned to identify methods likely to be called from the scanned bytecodes as hot and non-collectable. Hybrid approaches incorporating features from two or more of the above-described heuristics are also contemplated by alternative embodiments of the present invention.

Although the present invention is described herein with reference to a specific preferred embodiment, many modifications and variations therein will readily occur to those with ordinary skill in the art. Accordingly, all such variations and modifications are included within the intended scope of the present invention as defined by the following claims.

What is claimed is:

1. A method comprising:
    storing native code associated with a first method and a second method within a native code space;
    associating a reference to the first method and the second method in a method table;
    determining whether the first method or the second method is invoked by detecting whether the first method or the second method correspond to the native code;
    determining whether the native code space exceeds a predefined native code space size threshold in response to an invocation of the first method or the second method wherein the determination whether the native code space exceeds the predefined native code space size threshold is performed by native code size threshold check code inserted into a compilation stub of JVM;
    incrementing method counters each time the first method or the second method is invoked, wherein the method counters correspond to the first method and the second method;
    unwinding a stack to determine whether the first method or the second method is active based on whether a corresponding method counter has exceeded a count threshold;
    reclaiming the native code associated with the first method and compiling byte code into native code associated with the second method in response to determining that the second method is active; and
    updating the method table for the first method to reference an appropriate symbolic reference to the compilation stub.

2. The method of claim 1, wherein reclaiming the native code associated with the first method and compiling byte code into native code associated with the second method in response to the determination comprises reclaiming the native code associated with the first method in response to a determination that the native code space exceeds the predefined native code space size threshold.

3. The method of claim 2, further comprising storing the native code associated with the second method within the native code space in response to the compilation.

4. The method of claim 2, further comprising:
    invoking the first method following the reclamation; and
    re-compiling byte code into the native code associated with the first method in response to the invocation of the first method.

5. The method of claim 2, wherein reclaiming the native code associated with the first method and compiling byte code into native code associated with the second method in response to the determination comprises compiling byte code into native code associated with the second method.

6. The method of claim 5, wherein compiling byte code into native code associated with the second method comprises compiling byte code into native code associated with the second method utilizing a just-in-time compiler.

7. The method of claim 2, wherein reclaiming the native code associated with the first method and compiling byte code into native code associated with the second method in response to the determination comprises:
    determining whether the first method is active or inactive; and
    reclaiming the native code associated with the first method in response to a determination that the first method is inactive.

8. The method of claim 7, further comprising:
    reclaiming the native code associated with the first method and compiling byte code into native code associated with the second method in response to the determination further comprises determining whether the first method is hot or cold in response to a determination that the first method is inactive; and
    reclaiming the native code associated with the first method in response to a determination that the first method is inactive comprises reclaiming the native code associated with the first method in response to a determination that the first method is cold.

9. A computer storage medium having stored thereon data representing sets of instructions which, when executed by a machine, cause the machine to:
    store native code associated with a first method and a second method within a native code space;
    associate a reference to the first method and the second method in a method table;
    determining whether the first method or the second method is invoked by detecting whether the first method or the second method correspond to the native code;
    determine whether the native code space exceeds a predefined native code space size threshold in response to an invocation of the first method and the second method wherein the determination whether the native code space exceeds the predefined native code space size threshold is performed by native code size threshold check code inserted into a compilation stub of JVM;
    increment method counters each time the first method or the second method is invoked, wherein the method counters correspond to the first method and the second method;
    unwind a stack to determine whether the first method or the second method is active based on whether a corresponding method counter has exceeded a count threshold;
    reclaim the native code associated with the first method and compiling byte code into native code associated with the second method in response to determining that the second method is active; and
    update the method table for the first method to reference an appropriate symbolic reference to the compilation stub.

10. The computer storage medium of claim 9, wherein reclaiming the native code associated with the first method and compiling byte code into native code associated with the second method in response to the determination comprises reclaiming the native code associated with the first method in response to a determination that the native code space exceeds the predefined native code space size threshold.

11. The computer storage medium of claim 9, wherein the sets of instructions when further executed, cause the machine to perform operations comprising storing the native code associated with the second method within the native code space in response to the compilation.

12. The computer storage medium of claim 9, wherein the sets of instructions when further executed, cause the machine to perform operations comprising invoking the first method following the reclamation; and re-compile byte code into the native code associated with the first method in response to the invocation of the first method.

13. The computer storage medium of claim 9, wherein reclaiming the native code associated with the first method and compiling byte code into native code associated with the second method in response to the determination further cause the machine to compile byte code into native code associated with the second method.

14. The computer storage medium of claim 13, wherein compiling byte code into native code associated with the second method further cause the machine to compile byte code into native code associated with the second method utilizing a just-in-time compiler.

15. The computer storage medium of claim 9, wherein reclaiming the native code associated with the first method and compiling byte code into native code associated with the second method in response to the determination further cause the machine to:
    determine whether the first method is active or inactive; and
    reclaim the native code associated with the first method in response to a determination that the first method is inactive.

16. A data processing system comprising:
    a storage device; and
    a processor coupled with the storage device, the processor to process data and execute instructions, the processor to:
        store native code associated with a first method and a second method within a native code space;
        associate a reference to the first method and the second method in a method table;
        determine whether the first method or the second method is invoked by detecting whether the first method or the second method correspond to the native code;
            determine whether the native code space exceeds a predefined native code space size threshold in response to an invocation of the first method and the second method wherein the determination whether the native code space exceeds the predefined native code space size threshold is performed by native code size threshold check code inserted into a compilation stub of JVM;
        increment method counters each time the first method or the second method is invoked, wherein the method counters correspond to the first method and the second method;
        unwinding a stack to determine whether the first method or the second method is active based on whether a corresponding method counter has exceeded a count threshold;
        reclaim the native code associated with the first method and compiling byte code into native code associated with the second method in response to determining that the second method is active; and
        update the method table for the first method to reference an appropriate symbolic reference to the compilation stub.

17. The data processing system of claim 16, wherein when reclaiming the native code associated with the first method and compiling byte code into native code associated with the second method in response to the determination, the processor is further to reclaim the native code associated with the first method in response to a determination that the native code space exceeds the predefined native code space size threshold.

18. The data processing system of claim 16, wherein the processor is further to store the native code associated with the second method within the native code space in response to the compilation.

19. The data processing system of claim 16, wherein the processor is further to invoke the first method following the reclamation; and re-compiling byte code into the native code associated with the first method in response to the invocation of the first method.

20. The data processing system of claim 16, wherein when reclaiming the native code associated with the first method and compiling byte code into native code associated with the second method in response to the determination, the processor is further to compile byte code into native code associated with the second method.

21. The data processing system of claim 20 wherein when compiling byte code into native code associated with the second method, the processor is further to compile byte code into native code associated with the second method utilizing a just-in-time compiler.

22. The data processing system of claim 16, wherein when reclaiming the native code associated with the first method and compiling byte code into native code associated with the second method in response to the determination, the processor is further to:
    determine whether the first method is active or inactive; and
    reclaim the native code associated with the first method in response to a determination that the first method is inactive.

23. The data processing system of claim 22, wherein the processor is further to:
    reclaim the native code associated with the first method and compiling byte code into native code associated with the second method in response to the determination further comprises determining whether the first method is hot or cold; and
    reclaim the native code associated with the first method in response to a determination that the first method is inactive comprises reclaiming the native code associated with the first method in response to a determination that the first method is cold.

* * * * *